(12) United States Patent
Bourk

(10) Patent No.: US 6,973,071 B1
(45) Date of Patent: Dec. 6, 2005

(54) METHOD AND APPARATUS FOR CONTROLLING THE FLOW OF DATA IN A WIRELESS COMMUNICATION SYSTEM

(75) Inventor: Terrance R. Bourk, La Jolla, CA (US)

(73) Assignee: RFMD WPAN, Inc., San Diego, CA (US)

(*) Notice: Subject to any disclaimer, the term of this patent is extended or adjusted under 35 U.S.C. 154(b) by 793 days.

(21) Appl. No.: 09/799,991

(22) Filed: Mar. 6, 2001

(51) Int. Cl.[7] .............................................. H04J 3/24
(52) U.S. Cl. ...................... 370/349; 370/389; 370/392
(58) Field of Search ................................ 370/349, 389, 370/229, 230, 231, 232, 233, 234, 235, 280, 370/281, 294, 295, 296, 252, 329, 330, 332, 370/333, 336, 337, 469, 345, 347, 442, 230.1, 370/236, 241, 242, 253, 310, 487, 537, 392, 370/400, 470–474; 455/39, 41.2, 517, 517.41, 455/41.1, 3.03, 3.05, 3.01; 709/249, 208, 709/245, 223, 238; 725/105

(56) References Cited

U.S. PATENT DOCUMENTS

| | | | |
|---|---|---|---|
| 6,377,548 B1 * | 4/2002 | Chuah ........................ 370/233 |
| 6,625,131 B1 * | 9/2003 | Yee-Madera et al. ....... 370/325 |
| 6,683,866 B1 * | 1/2004 | Stanwood et al. .......... 370/350 |
| 6,724,761 B1 * | 4/2004 | Moy-Yee et al. ........... 370/390 |
| 2001/0002908 A1 * | 6/2001 | Rune et al. ................. 370/392 |
| 2001/0002912 A1 * | 6/2001 | Tony et al. ................. 370/487 |
| 2001/0027490 A1 * | 10/2001 | Fodor et al. ............... 709/238 |
| 2002/0099854 A1 * | 7/2002 | Jorgensen ................... 709/249 |
| 2002/0151275 A1 * | 10/2002 | Trost et al. ................. 455/41 |
| 2002/0155808 A1 * | 10/2002 | Kawamura .................. 455/3.05 |
| 2003/0003867 A1 * | 1/2003 | Kawamura ................... 455/41 |
| 2003/0021262 A1 * | 1/2003 | Ma et al. ..................... 370/352 |
| 2003/0067903 A1 * | 4/2003 | Jorgensen ................... 370/338 |
| 2003/0188028 A1 * | 10/2003 | Kawamura .................. 709/249 |
| 2003/0214928 A1 * | 11/2003 | Chuah ........................ 370/336 |

OTHER PUBLICATIONS

"Specification of the Bluetooth System", Specification vol. 1, Version 1.1, Part B, Sections 4.1-4.3, 4.5, 5.3 and 8.3, pp. 47-53, 62-64, 68-71 and 83, Feb. 22, 2001.*
"Specification of the Bluetooth System", Specification vol. 1, Version 1.1, Sections 4.1-4.3, 4.5, 5.3 and 8.3, pp. 47-53, 62-64, 68-71 and 83, Feb. 22, 2001.*

* cited by examiner

Primary Examiner—Wellington Chin
Assistant Examiner—Jamal A. Fox
(74) Attorney, Agent, or Firm—Withrow & Terranova, PLLC

(57) ABSTRACT

The present invention is a novel method and apparatus for controlling packet data flow in Bluetooth devices. The present Bluetooth flow control method and apparatus reduces data buffer overflow conditions using an inventive flow control technique comprising a dual flow control step and a payload header flow control step. In the dual flow control step, the present inventive method initially enables (i.e., transmits to a transmitting device) both packet header flow control and payload header flow control. In one embodiment, the Bluetooth flow control technique utilizes non-acknowledgment of "nack" commands to enable packet header flow control. In another embodiment, the Bluetooth flow control technique utilizes a packet header flow control bit to enable packet header flow control. In the payload header flow control step, the method determines whether payload header flow control information has been successfully received and, if so, it disables packet header flow control.

23 Claims, 7 Drawing Sheets

METHOD AND APPARATUS FOR CONTROLLING THE FLOW OF DATA IN A WIRELESS COMMUNICATION SYSTEM

BACKGROUND OF THE INVENTION

1. Field of the Invention

This invention relates to message flow control for use in wireless devices, and more particularly to a method and apparatus for controlling the flow of data in Bluetooth devices.

2. Description of Related Art

Wireless communication systems facilitate high-speed connectivity and data transport from point-to-point and point-to-multipoint bases. Exemplary wireless communication systems include "Bluetooth protocol" systems that facilitate the transport of data between Bluetooth devices such as personal digital assistants (PDAs) and cellular phones. The Bluetooth protocol is a global specification standard for radio communications operating at 2.4 GHz radio frequencies. Bluetooth devices (i.e., those that comply with the Bluetooth Specification) replace normal cable connections using short-range radio links. Bluetooth protocol technology is featured in cordless telephony, intercom, FAX and LAN access, and dial-up networking applications. Bluetooth wireless communication software protocols are implemented in PDAs, cellular phones, printers, and other mobile devices. Bluetooth devices are described in more detail in a specification produced by the Bluetooth special interest group (SIG), entitled "Bluetooth Specification Version 1.0B", electronically available to the public via the well-known Internet at <http://www.bluetooth.com>, published in December 1999, referred to herein as the "Bluetooth Specification", and hereby incorporated for reference herein in its entirety for its teachings on Bluetooth flow control, signals, devices and communication protocols and schemes.

FIG. 1 is a block diagram showing an exemplary Bluetooth communication system. As shown in FIG. 1, the exemplary Bluetooth communication system 100 comprises a transmitting device 10 and a receiving device 20. The transmitting device 10 transmits data to the receiving device 20 via a downlink 2. The receiving device 20 transmits data to the transmitting device 10 via an uplink 4. The transmitting device 10 includes a radio 12 and a transmission buffer 14. The radio 12 includes a transmitter 16 and a receiver 18. The transmitter 16 is operatively coupled to the transmission buffer 14. Data awaiting transmission is temporarily stored in the transmission buffer 14 until the transmitter 16 is able to transmit the data to a receiver 28 via the downlink 2.

As shown in FIG. 1, the receiving device 20 includes a radio 22 and a reception buffer 24. The radio 22 includes a transmitter 26 and a receiver 28. The receiver 28 is operatively coupled to the reception buffer 24. Data received by the receiver 28 is stored in the reception buffer 24 until the receiving device 20 is able to process the data. The transmission buffer 14 and the reception buffer 24 comprise a plurality of "buffer slots" wherein each buffer slot is capable of containing a single data packet. A Bluetooth typical communication scheme is now described.

Bluetooth devices utilize a communication protocol known as an Automatic Repeat Request (ARQ) scheme that aids in determining whether a packet is successfully received. The ARQ scheme is described in the Bluetooth Specification at Part B, section 5.3, and thus is not described in more detail herein. In accordance with the ARQ scheme, a transmitting device transmits and re-transmits a packet to a receiving device until the transmitting device receives an acknowledgement of a successful reception from the receiving device. One disadvantage of the ARQ scheme known as "buffer overflow" may occur when receiving devices suffer "bottlenecks" or temporary processing delays. Buffer overflows occur when reception buffers fill to capacity and thus subsequent received data is lost. To prevent buffer overflows from occurring, receiving devices require a mechanism capable of stopping transmitting devices from continuing to transmit packets under these circumstances.

Flow control schemes allow receiving Bluetooth protocol devices to stop transmitting Bluetooth protocol devices from transmitting certain or all types of data. Flow control refers to the management of data (e.g., control messages and user data) that is transmitted between communication devices. Flow control schemes have been developed to facilitate high-speed connectivity and data transfer between Bluetooth protocol devices.

Bluetooth flow control schemes typically comprise several levels of flow control. An exemplary flow control scheme may have internal flow control, payload flow control and packet flow control. An exemplary internal flow control that is utilized in Bluetooth flow control schemes is HCI flow control. FIG. 2 is a block diagram of an exemplary Bluetooth protocol communication system that depicts various flow control levels. As shown in FIG. 2, the exemplary Bluetooth protocol communication system 200 comprises a master device 40 and a slave device 50. The master device 40 communicates with the slave device 50 via an airlink 5. The master device 40 typically comprises an application 42, a link manager 44, a baseband device 46 and a radio 12. The application 42 is operatively coupled to the link manager 44. The baseband device 46 is operatively coupled to the link manager 44 and the radio 12. Similarly, the slave device 50 typically comprises an application 52, a link manager 54, a baseband device 56 and a radio 22. The application 52 is operatively coupled to the link manager 54. The baseband device 56 is operatively coupled to the link manager 54 and the radio 22. The airlink 5 comprises a downlink 2 and an uplink 4.

The exemplary Bluetooth protocol communication system 200 of FIG. 2 implements a flow control scheme comprising an internal flow control 60, a payload flow control 62 and a packet flow control 64. The flow control scheme utilizes data transmitted over the airlink 5 to provide a physical medium for implementing the several levels of flow control. The internal flow control 60 allows the slave application 52 to stop lower layers of its protocol from sending subsequent data up to the application. This subsequent data includes certain types or all types of user data traffic. When the slave application 52 invokes the internal flow control it forces the lower layers of its protocol to buffer incoming data (i.e., store incoming data in buffers). As incoming data begins to fill these buffers to maximum capacity, the communication system 200 invokes payload header flow control 62 and/or the packet header flow control 64.

The payload flow control 62 allows the slave link manager 54 to stop the master link manager 44 from transmitting certain types, or all types of data. The packet flow control 64 allows the slave baseband device 56 to similarly stop the master baseband device 46. In accordance with the Bluetooth Specification, payload flow control can be used to stop the transmission of user data. Packet flow control can only be used to stop the transmission of all data types (i.e., both control messages and user data).

Software processing of flow control messages produces processing delays known as "flow control lags". A flow control lag is defined as a time difference (measured in a number of packets transmitted during the time difference) between the instant that a flow control stop request is received and the instant that data transmission is terminated. To help prevent data buffer overflows, reception buffers comprise a predetermined quantity of buffer slots (e.g., M+N buffer slots of the reception buffer 24 of FIG. 1). When the reception buffer fills to a predetermined capacity (e.g., M packets), a flow control stop request is transmitted to the transmitting device. Thus, the reception buffer has auxiliary buffer slots (e.g., N buffer slots) available for storing packets that are transmitted during a flow control lag. Lower level flow controls (e.g., packet flow control) are typically processed in hardware. Higher level flow controls (e.g., payload flow control) are typically processed in software and can produce flow control lags.

One significant disadvantage of the above-described exemplary flow control scheme is known as "partial packet reception." Partial packet reception occurs when transmitting devices receive partially damaged packets. In this event, packet headers can be received intact, but if any part of the payload is in error the CRC on the payload will fail and thus the payload header cannot be used. In partial packet reception events, buffer overflows may occur when the payload headers contain payload flow control stop requests. Thus, a transmitting device shall continue to transmit packets in accordance with an ARQ scheme because the received packet header acts to acknowledge previously transmitted packets. Also, the transmitting device will not enable the payload flow control to stop the transmission of data because the payload arrived in a damaged condition. Techniques have been developed to overcome this disadvantage.

One technique that has been attempted to overcome the above-described disadvantage utilizes supplemental random access memory (RAM) to help prevent buffer overflows associated with partial packet reception. A disadvantage of this technique is the extra cost associated with the necessity of using supplemental RAM devices. Supplemental RAM installed into a device can be prohibitively expensive, especially for compact devices such as PDAs. Alternatively, supplemental RAM may be obtained by "borrowing" RAM memory from other functions within the communication device. However, this may further detrimentally affect the performance of the device and create unwanted bottlenecks. Another disadvantage of the above-described technique is that buffer overflows may still occur when partial packet reception conditions exist for an extended period of time.

Another technique that has been attempted to overcome the above-described disadvantage regarding partial packet reception utilizes only packet header flow control. Disadvantageously, packet header flow control can only stop the transmission of all data types (i.e., control messages and user data) on the downlink. Receiving devices may require the use of payload header flow control information because it can stop the transmission of user data and thus allow control messages to be transmitted. Stopping the transmission of only user data on the downlink is advantageous because control messages may contain important information such as power control information.

Therefore, a need exists for a method and apparatus for controlling packet flow in Bluetooth devices. The method and apparatus should utilize several levels of flow control including payload flow control. Further, a need exists for Bluetooth flow control that does not adversely affect the cost or the performance of devices using the Bluetooth flow control methods. The present invention provides such a Bluetooth flow control method and apparatus.

SUMMARY OF THE INVENTION

The present invention is a novel method and apparatus for controlling the flow of data in Bluetooth devices. The present Bluetooth data flow control method and apparatus reduces data buffer overflow conditions through the use of an inventive flow control technique comprising a dual flow control step and a payload header flow control step. In the dual flow control step, the present inventive method initially enables (i.e., transmits to a transmitting device) both packet header flow control and payload header flow control information. In one embodiment, the Bluetooth flow control technique utilizes non-acknowledgment or "nack" commands to enable packet header flow control. In another embodiment, the Bluetooth flow control technique utilizes a packet header flow control bit to enable packet header flow control. In the payload header flow control step, the method determines whether payload header flow control information has successfully been received and, if so, it disables packet header flow control. An exemplary communication system that can be adapted for use with the present invention is also described. The flow control techniques described hereinbelow utilize payload header flow control to stop the transmission of user data. These flow control techniques also utilize packet header flow control for only a short time period and thus control packet flow is not impeded.

BRIEF DESCRIPTION OF THE DRAWINGS

Like reference numbers and designations in the various drawings indicate like elements.

DETAILED DESCRIPTION OF THE INVENTION

Figure 1:
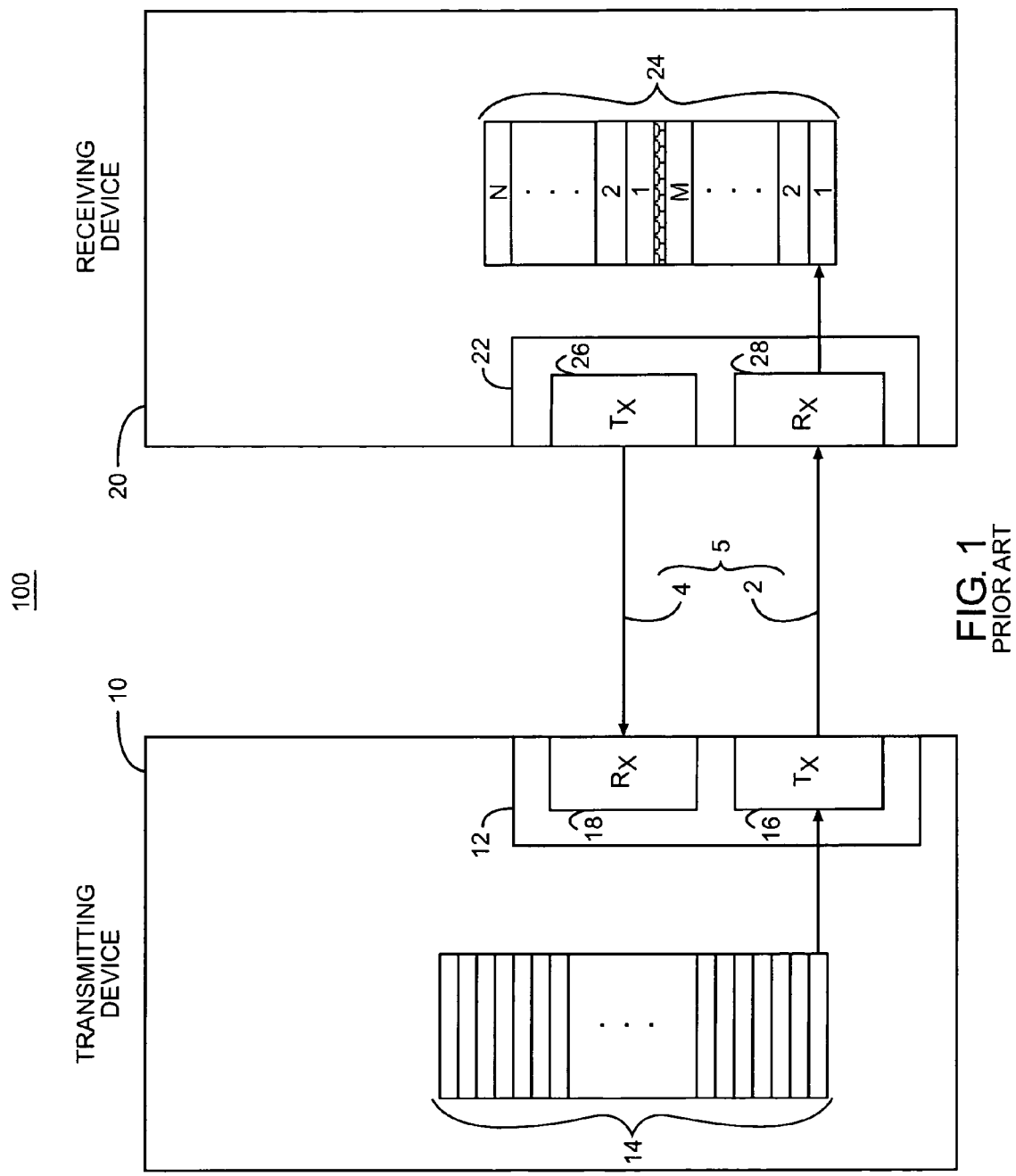
FIG. 1 is a simplified block diagram of an exemplary Bluetooth communication system.

Throughout this description, the preferred embodiment and examples shown should be considered as exemplars, rather than as limitations on the present invention.

The present invention is a method and apparatus for controlling packet flow in Bluetooth devices. The present invention reduces buffer overflow conditions through the use of an inventive flow control technique. The present inventive method and apparatus relies upon the observations that (1) packet header flow control information is generally more robust than is payload header flow control information and (2) in order to receive a payload, a device must first receive an undamaged packet header. Thus, as described above with reference to partial packet reception, packet headers have higher probabilities of being received undamaged than do payload headers. Payload headers can be received undamaged only when the packet has been received undamaged.

The present invention performs payload header flow control through utilization of an inventive two-step technique comprising a dual flow control step and a payload header flow control step. In the dual flow control step, the present inventive method initially enables (i.e., transmits to a transmitting device) both packet header flow control and payload header flow control. In the payload header flow control step, the method determines whether payload header flow control has been successfully received and, if so, disables packet header flow control.

One of ordinary skill in the data flow control and communications arts shall recognize that other communication embodiments having packet header flow control and payload header flow control can be used with the present flow control techniques without departing from the scope or spirit of the present invention. In one embodiment, the Bluetooth flow control technique utilizes non-acknowledgment or "nack" commands to enable packet header flow control. In another embodiment, the Bluetooth flow control technique utilizes a packet header flow control bit to enable packet header flow control. The flow control techniques described hereinbelow utilize payload header flow control to stop the transmission of user data.

Exemplary Bluetooth Communication System Adapted for Use with the Present Invention The exemplary Bluetooth communication system described hereinbelow is described in greater detail in the Bluetooth Specification at Part B sections 4, 5.3, and 8.3 incorporated by reference herein. One skilled in the art shall recognize that the described wireless communication system is exemplary only and therefore is not meant to be a limitation to the present invention. Other wireless communication systems can be utilized with the present invention without departing from the scope or spirit of the present invention. Examples of wireless communication systems that can be utilized with the present invention include broadband wireless communication systems, cellular IP communication systems and satellite communication systems. The present invention can be utilized in any wireless communication system where flow control of data is desired, flow control occurs at successive layers of a protocol and the delay or latency of implementing flow control at a given level is much longer than desirable. The flow control at lower layers can then be invoked for a time period until confirmation that a flow control message has been received occurs.

Figure 3:
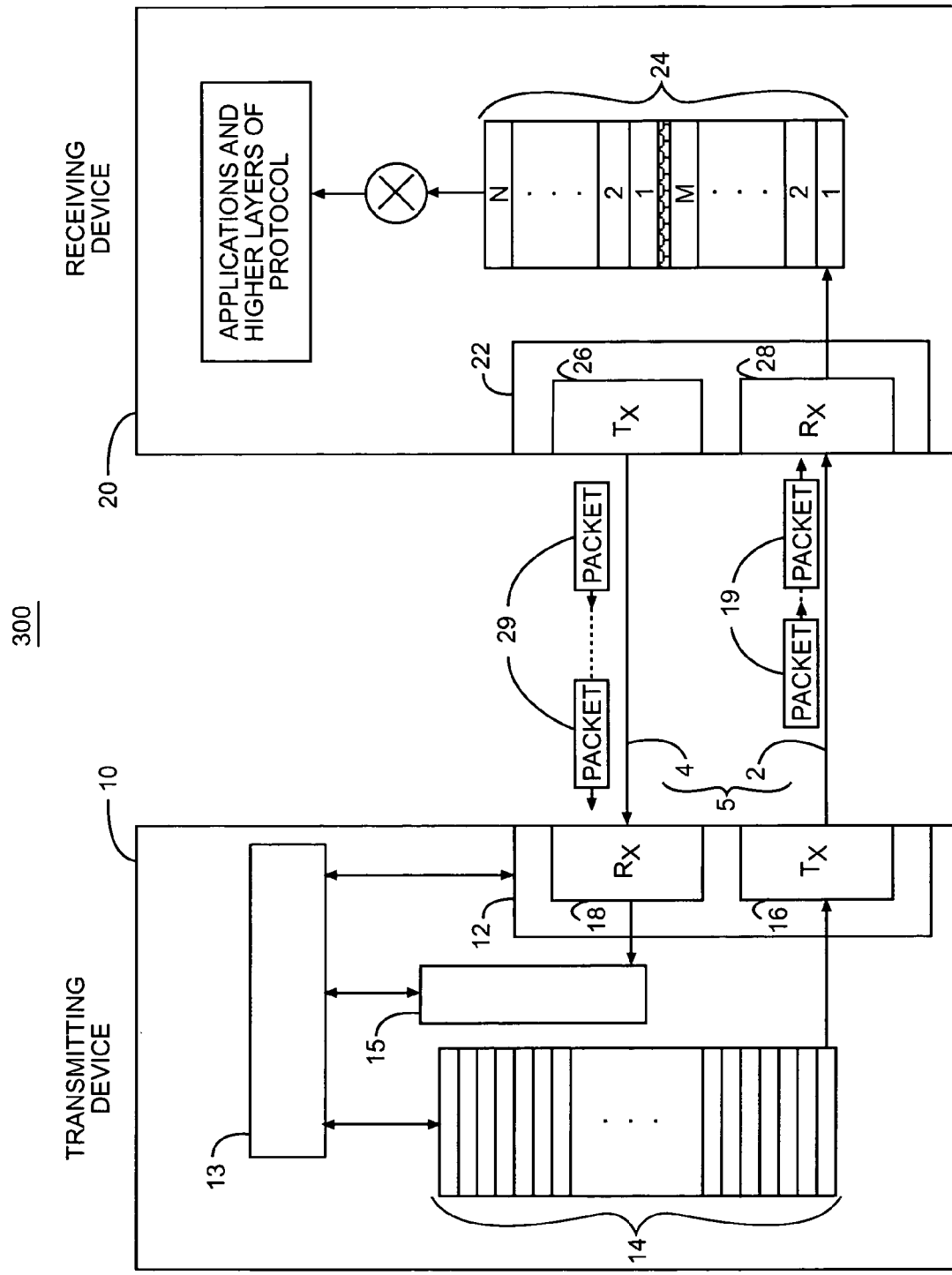
FIG. 3 is a simplified block diagram of an exemplary Bluetooth communication system adapted for use with the present invention.

FIG. 3 is a block diagram of an exemplary Bluetooth communication system adapted for use with the present invention. FIG. 3 is substantially similar to FIG. 1 and thus identical elements are not described again herein. As shown in FIG. 3 and described in more detail in the incorporated Bluetooth Specification, the exemplary Bluetooth communication system 300 comprises a transmitting device 10 and a receiving device 20.

The transmitting device 10 and the receiving device 20 are substantially similar to each other and thus only the transmitting device 10 is described in detail herein. The transmitting device 10 comprises a radio 12, a computing device 13, a transmission buffer 14 and a reception buffer 15. The radio 12 is operatively coupled to the computing device 13. Examples of computing devices include microprocessors, logic gate arrays, VLSIs and ASICs. One skilled in the art shall recognize that different computing devices can be utilized with the present invention without departing from its scope or spirit. The computing device 13 includes memory such as RAM that can be utilized as buffer slots. The radio 12 is also operatively coupled to the transmission buffer 14 and the reception buffer 15. Similarly, the computing device 13 is operatively coupled to the transmission buffer 14 and the reception buffer 15.

The radio 12 comprises radio frequency circuits that are capable of creating transmit signals and receiving and down-converting received signals. The radio 12 also comprises a modulator function that is capable of converting digital data packets to analog waveforms for encoding on radio frequency signals. Similarly, the radio 12 comprises a demodulator that is capable of recovering digital data streams from received signals. The transmitting device radio 12 is capable of transmitting downlink data packets 19 to the receiving device radio 22 via the downlink 2. Similarly, the receiving device radio 22 is capable of transmitting uplink data packets 29 to the transmitting device radio 12 via the uplink 4.

Figure 2:
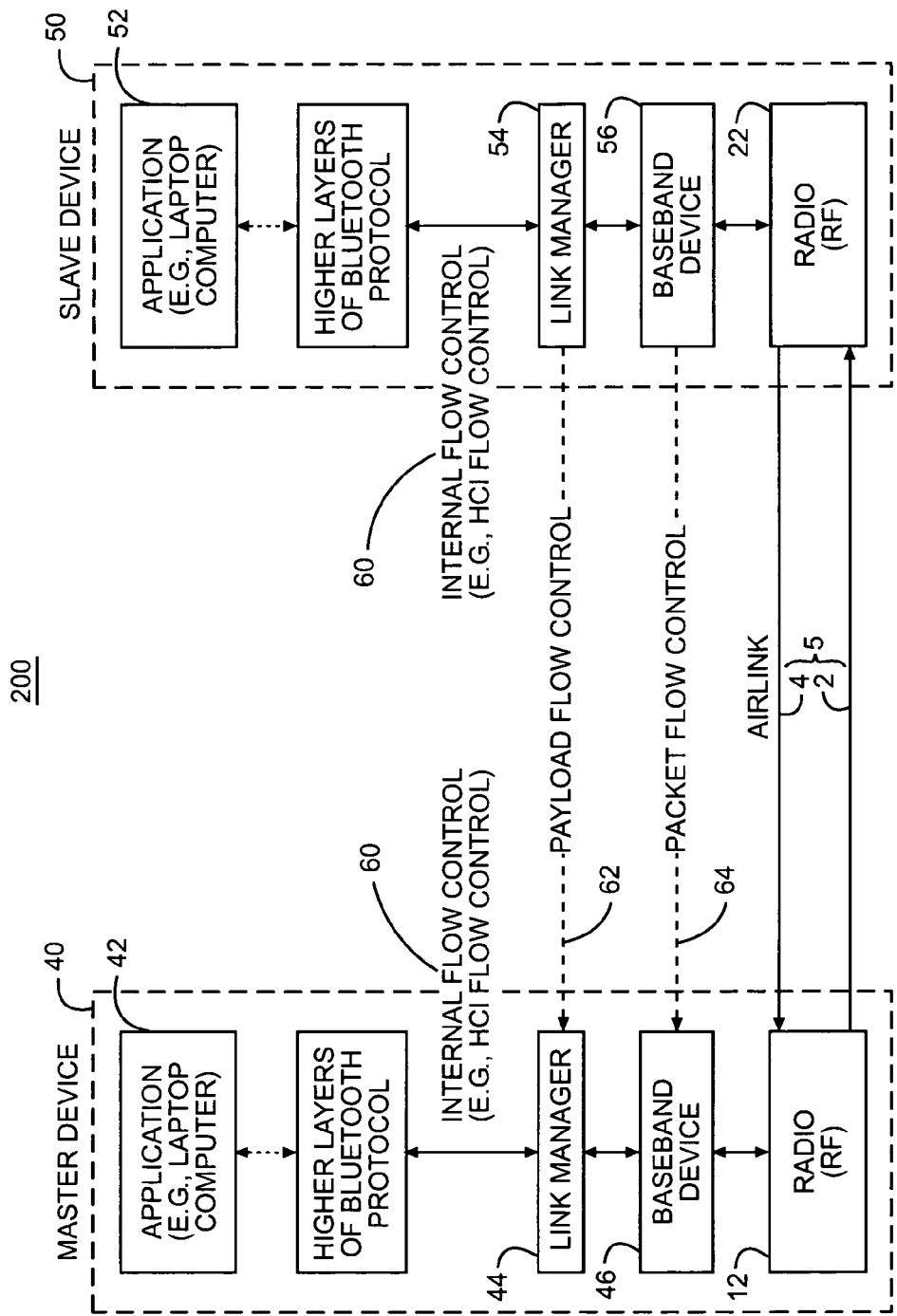
FIG. 2 is a simplified block diagram of an exemplary Bluetooth communication system that depicts various data flow control levels.

The transmitting device 10 further includes a baseband device, a link manager and an application (not shown in FIG. 3) that are described above with reference to FIG. 2. The baseband device is responsible for controlling the radio 12 and modem (not shown), formatting the data packets that are sent over a radio link or airlink 5, performing packet processing (e.g., forward error correction, encryption, CRC and HEC) and determining the timing of transmit events and tracking the timing of receive events. Baseband devices are typically implemented in hardware such as an ASIC.

The link manager interfaces with higher layers of protocol by transmitting commands that set up connections and reporting status, buffering receive and transmit data and performing a link manager protocol for transmitting control messages over the radio link or airlink 5 between communicating Bluetooth devices. Link managers are typically implemented in software on a low cost, low power microprocessor.

The higher layers of Bluetooth protocol are typically industry standard protocols such as TCP/IP (internet protocol), OBEX (object exchange protocol for electronic business cards and schedule data structures), telephony call set up protocols and serial link emulation.

Figure 4:
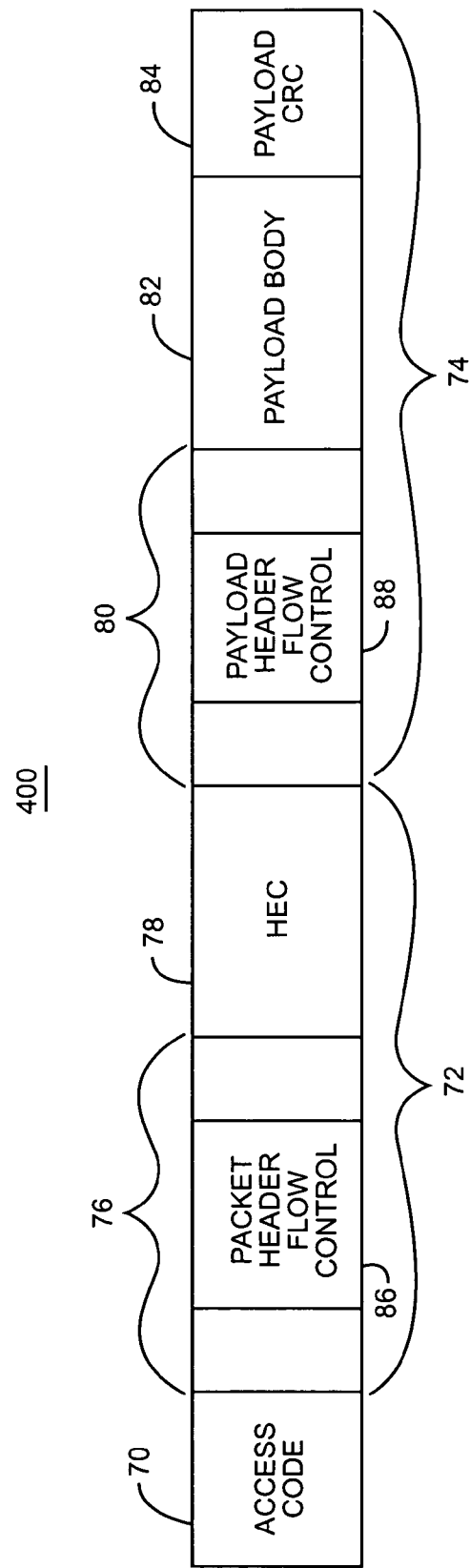
FIG. 4 is a block diagram of an exemplary packet format adapted for use with the present invention.

FIG. 4 is a block diagram of an exemplary packet format adapted for use with the present invention. The exemplary packet format is described in greater detail in the Bluetooth Specification at Part B section 4. One skilled in the art shall recognize that the packet format described herein is exemplary only and that other packet format configurations including a packet header and a payload header can be utilized without departing from the scope or spirit of the present invention. As shown in FIG. 4, the exemplary packet 400 comprises an access code 70, a header 72 and a payload 74. In accordance with the exemplary packet format, the access code 70 includes information regarding synchronization, DC offset compensation and identification.

The header 72 further includes a packet header 76 and a header error check (HEC) 78. The header 72 comprises information regarding link control. In the exemplary packet format, the packet header 76 further comprises a packet header flow control 86 having a length of one bit. As described in the Bluetooth Specification, a receiving device can transmit a request for the transmitting device to temporarily halt the transmission of data to the receiving device by setting the packet header flow control 86 to a value of logical zero. The receiving device can signal a "GO" indication (i.e., an indication that data transmission can resume) by setting the packet header flow control bit 86 to a value of logical one. The HEC 78 is a mechanism that aids a device in determining whether the header 72 has been validly received. In one embodiment, a well-known polynomial code error check method is utilized. One skilled in the communications art shall recognize that different error check mechanisms that are robust can be utilized with the present invention without departing from its scope or spirit. Examples of error check mechanisms that can be utilized with the present invention include parity check, block sum check, polynomial code check, frame check sequence (FCS) and cyclic redundancy codes.

In the exemplary packet 400, the payload 74 is used to transport an asynchronous data field. The payload 74 further comprises a payload header 80, a payload body 82 and a payload cyclic redundancy check (CRC) 84. In the exemplary packet format, the payload header 80 further comprises a payload header flow control 88 having a length of one bit. In accordance with the exemplary Bluetooth communication system, the payload header flow control 88 controls the flow of data at a user data level. Thus, the payload header flow control 88 only controls user data flow (in contrast to controlling the flow of other messages such as control messages). The payload header flow control 88 operates to request a transmitting device to stop data transmission in a similar manner to the above-described packet header flow control 86 and thus is not described in detail herein. The payload body 82 includes information regarding a user host.

The CRC 84 is a mechanism that aids a device in determining whether the payload 74 has been validly received. In one embodiment, a well-known 16-bit cyclic redundancy check code generated by a CRC-CCITT polynomial having an octal value of "210041" is utilized. One skilled in the communications art shall recognize that the above-described 16-bit CRC is exemplary only and that different CRC codes and error check mechanisms can be utilized with the present invention without departing from its scope or spirit. Examples of error check mechanisms that can be utilized with the present invention include block sum check, polynomial code check and frame check sequence (FCS) codes.

The exemplary Bluetooth communication system 300 utilizes the flow control scheme described above with reference to FIG. 2 that comprises internal flow control (e.g., HCI flow control), packet header flow control and payload header flow control. As described above, certain internal flow control schemes can create buffer overflow problems and thus these types of internal flow control schemes (e.g., HCI flow control) can benefit greatly from utilization of the present invention. One skilled in the data flow control art shall recognize that buffer overflow problems can occur in any flow control scheme where upper layers of protocol are unable to accept data at a rate that is at least equal to the rate that data is transmitted over the airlink. For example, the host controller interface (HCI) utilized in Bluetooth systems are unable to accept data at a 1 Mpbs rate which is the rate that data is transmitted over a Bluetooth airlink.

As described above with reference to FIG. 2, flow control schemes typically comprise several levels of flow control. In accordance with the exemplary Bluetooth communication system, payload flow control can be used to stop the transmission of user data and packet flow control can be used to stop the transmission of all data types (i.e., both control messages and user data). One skilled in the data flow control art shall recognize that the present invention can be utilized with a flow control scheme that comprises only packet header flow control and payload header flow control.

The exemplary Bluetooth communication system utilizes an "ARQ" communication protocol. As described in the incorporated Bluetooth Specification at Part B section 5.3, the ARQ communication protocol aids in determining whether a packet has been successfully received. In accordance with the ARQ communication protocol, a transmitting device continuously transmits a packet to a receiving device until the transmitting device receives an acknowledgement of a successful reception from the receiving device.

One potential drawback of using an ARQ communication protocol in combination with an application that sometimes accepts data packets at a slower rate than the communications link delivers them is that reception buffers can overflow due to partial packet reception conditions as described above. However, occurrences of this potential buffer overflow condition can be reduced. For example, a Bluetooth flow control technique that increases flow control stability can be utilized. The Bluetooth flow control techniques of the present invention are now described in detail.

Bluetooth Flow Control Techniques of the Present Invention

The present inventive method and apparatus reduces the probability of encountering data buffer overflow conditions. The present inventive method and apparatus relies upon the observation that packet header flow control information is generally more robust than is payload header flow control information. For example, a device may receive a packet comprising a packet header that has a valid HEC and a payload that has an invalid CRC (i.e., a partial packet reception condition). If a packet has an invalid HEC, the entire packet is considered rejected because the header contents are corrupted and hence the packet type and other control information is uncertain.

The present invention performs Bluetooth flow control through the utilization of an inventive two-step technique. In one embodiment, the Bluetooth flow control technique of the present invention performs a dual flow control step and a payload header flow control step. In the dual flow control step, the present inventive method enables both packet header flow control and payload header flow control. In one embodiment, the Bluetooth flow control technique utilizes "nack" commands to enable packet header flow control. In another embodiment, the Bluetooth flow control technique utilizes a packet header flow control bit to enable packet header flow control. In the payload header flow control step, the method determines whether the payload header flow control has been successfully received. If so, the packet header flow control is disabled (i.e., it is no longer transmitted to the transmitting device). Thus, in accordance with the present inventive Bluetooth flow control technique, a receiving device enables both packet header flow control and payload header flow control until a payload acknowledgment is received from a transmitting device.

As one of ordinary skill in the flow control art shall recognize, the flow control techniques of the present invention can be used with other communication embodiments having packet header flow control and payload header flow control without departing from the scope or spirit of the present invention. The flow control techniques described hereinbelow are described as being implemented in an exemplary Bluetooth communication system. The Bluetooth communication system implementation is meant to be exemplary only as one of ordinary skill in the communications art shall recognize that other communication system implementations can be used without departing from the scope of the present invention. Three embodiments of the Bluetooth flow control technique of the present inventive method are now described with reference to FIGS. 5a–5c.

Figure 5A:
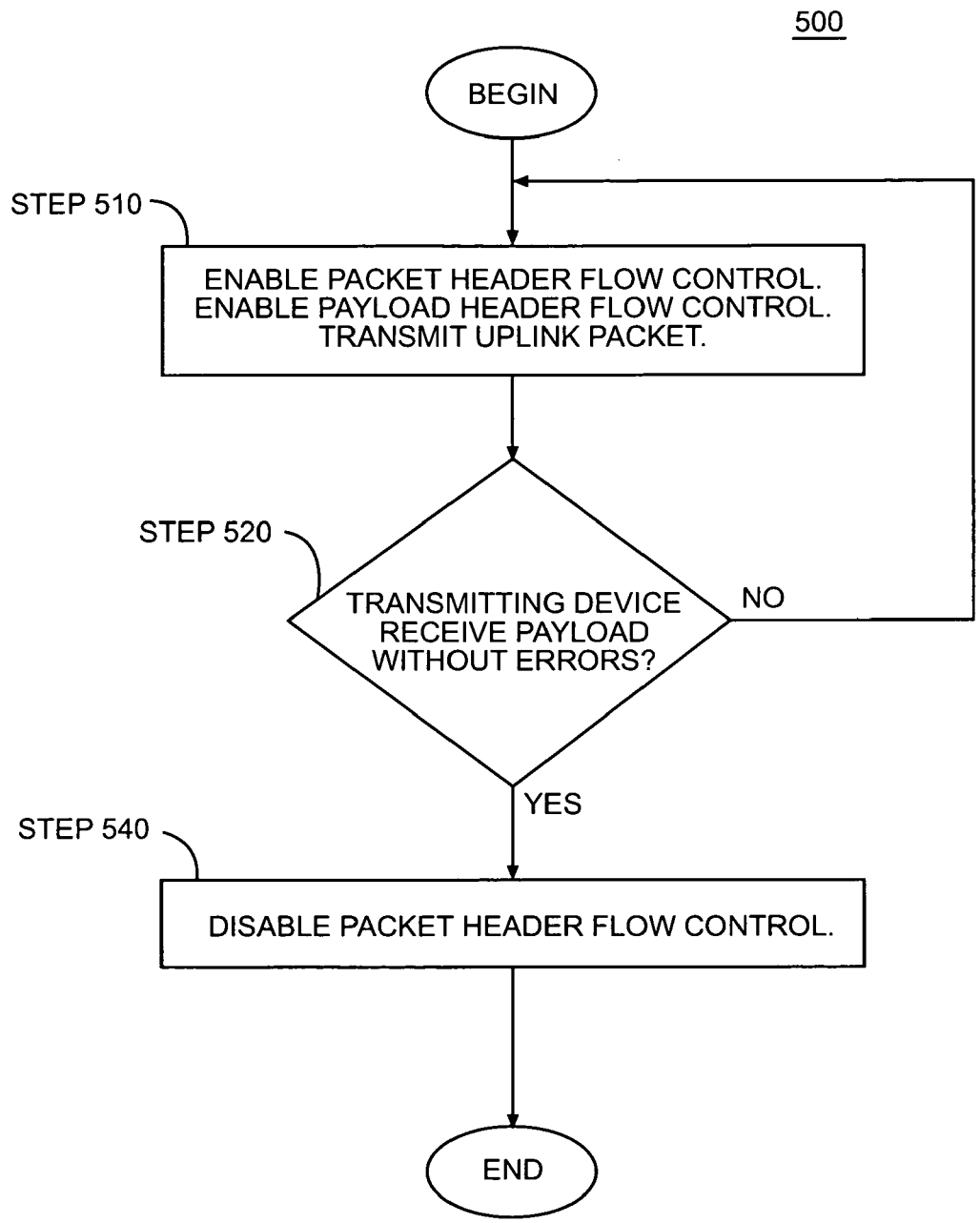
FIG. 5a is a flowchart of a first embodiment of the present inventive method.

FIG. 5a is a flowchart of a first embodiment of the present inventive method. As shown in FIG. 5a, the technique of the first embodiment 500 begins at a STEP 510 whereat the method enables both packet header flow control and payload header flow control. Thus, in order to transmit a request to a transmitting device to stop the transmission of subsequent packet data, a receiving device transmits a packet header flow control message and payload header flow control message in any well-known manner. One such manner is described above with reference to the exemplary Bluetooth communication system. In accordance with the first embodiment 500 of the present invention, a receiving device transmits an uplink packet (i.e., a packet transmitted from a receiving device to a transmitting device) wherein the uplink packet comprises information regarding packet header flow control and payload header flow control.

After the STEP 510, the method proceeds to a decision STEP 520 whereat the method determines whether the transmitting device received the payload of the uplink packet (that was transmitted in the STEP 510) without errors. In the exemplary Bluetooth communication system, one technique that is used for determining whether a payload has been received without errors comprises the above-described CRC error check mechanism. If the method determines at the decision STEP 520 that the transmitting device received the payload with errors, the method returns to the STEP 510 and resends the request to invoke both payload header and packet header flow control.

Referring again to FIG. 5a, if the method determines that the transmitting device received the payload without errors, the method proceeds to a STEP 540. The first embodiment 500 of the present inventive method ends at the STEP 540 whereat the method disables packet header flow control and thus allows the transmitting device to begin transmitting control type downlink packets. The payload flow control is still enabled and thus prevents user data packets from being transmitted. The payload flow control will remain enabled until sufficient buffering is available in the receiving device. A second embodiment of the present inventive method is now described.

Figure 5B:
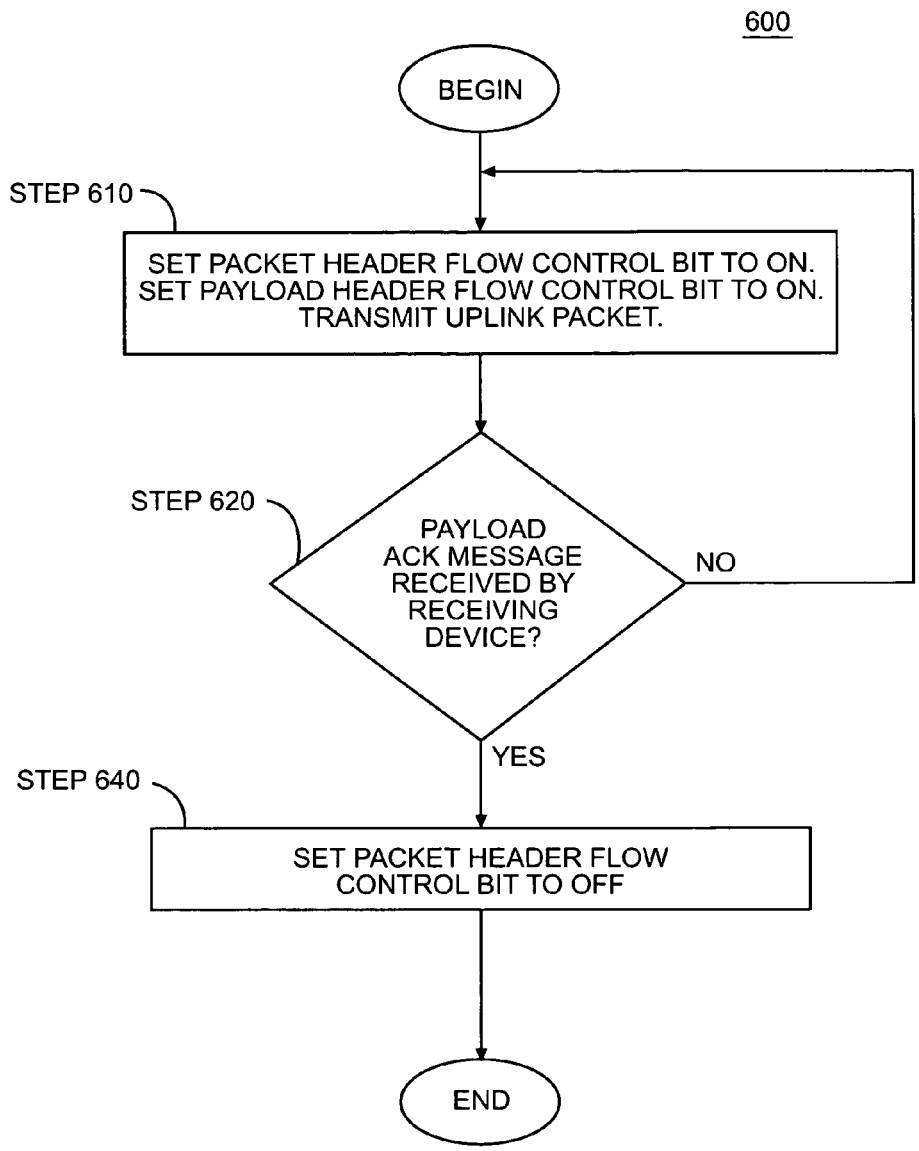
FIG. 5b is a flowchart of a second embodiment of the present inventive method.

FIG. 5b is a flowchart of a second embodiment of the present inventive method. As shown in FIG. 5b, the technique of the second embodiment 600 begins at a STEP 610 whereat the method enables both packet header flow control and payload header flow control. In accordance with the second embodiment 600 of the present invention, a receiving device transmits an uplink packet wherein the uplink packet comprises an enabled packet header flow control bit and an enabled payload header flow control bit. In accordance with the above-described exemplary Bluetooth communication system, a flow control bit is enabled or "on" when it has a value of logical zero.

After the STEP 610, the method proceeds to a decision STEP 620 whereat the method determines whether the transmitting device received the payload of the uplink packet (that was transmitted in the STEP 610) without errors. In accordance with the second embodiment 600, the method determines at the decision STEP 620 whether a receiving device has received a payload ack message (i.e., a message acknowledging receipt of a valid payload). One skilled in the communication art shall recognize that different messages can be utilized with the second embodiment 600 without departing from the scope or spirit of the present invention.

If the method determines at the decision STEP 620 that the receiving device has not received a payload ack message, the method returns to the STEP 610 and resends the request to invoke both payload header and packet header flow control. If the method determines that the receiving device has received a payload ack message, the method proceeds to a STEP 640.

The second embodiment 600 of the present inventive method terminates at the STEP 640 whereat the method disables or "turns off" packet header flow control by setting the packet header flow control bit to a value of logical one and thus transmits packet headers indicating that the transmitting device can resume sending control packets. Therefore, the payload header flow control, which is still enabled, prevents only user data packets from being transmitted by the transmitting device. A third embodiment of the present inventive method is now described.

Figure 5C:
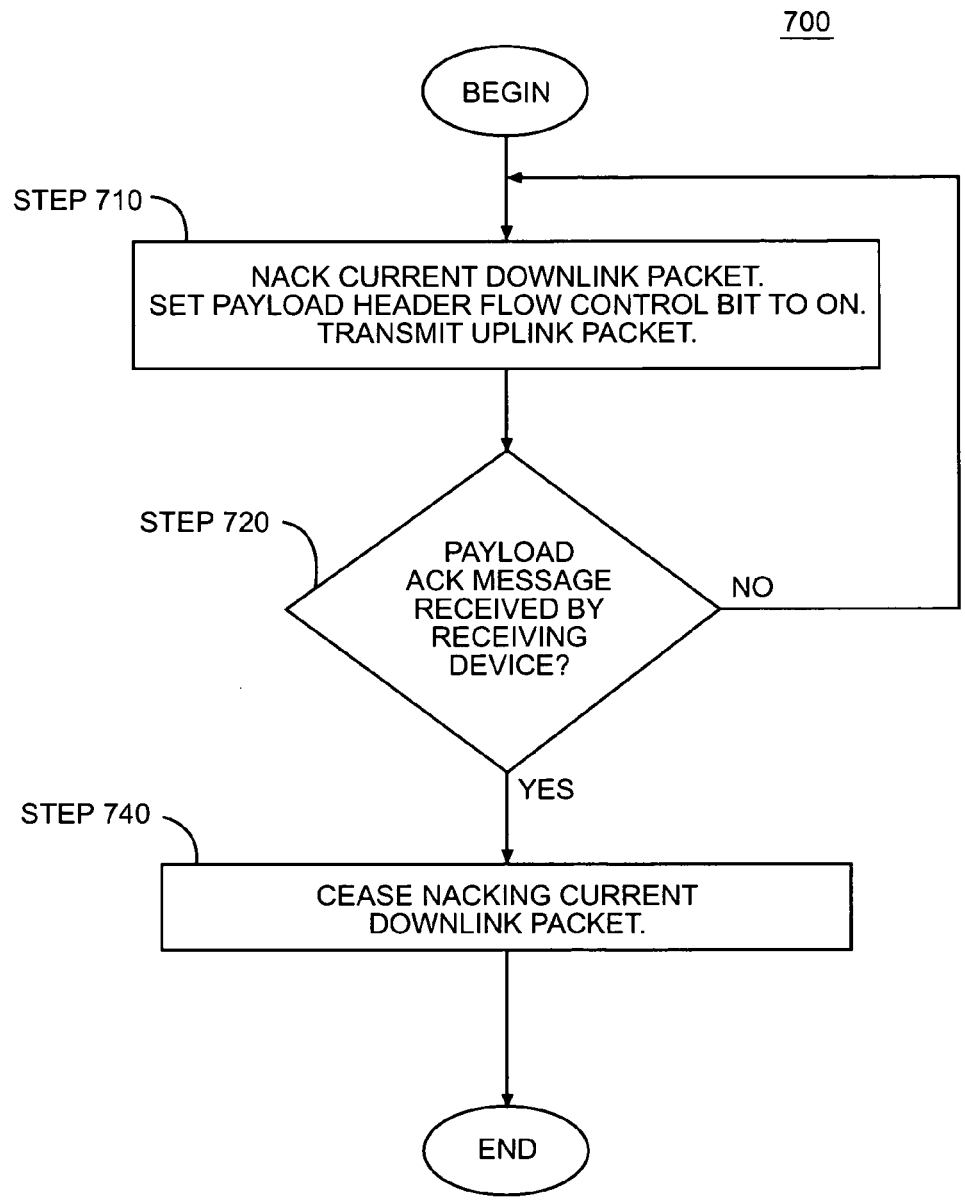
FIG. 5c is a flowchart of a third embodiment of the present inventive method.

FIG. 5c is a flowchart of a third embodiment of the present inventive method. As shown in FIG. 5c, the technique of the third embodiment 700 begins at a STEP 710 whereat the method "nacks" a current downlink packet, enables payload header flow control and transmits an uplink packet. As described in more detail in the incorporated Bluetooth Specification, a "nack" is defined as a signal of not acknowledging receipt of a packet.

The "nack" is normally used to indicate that the packet was received with a valid packet header but with a failure in the payload (payload CRC is bad). For example, in Bluetooth systems, an implicit request to re-transmit the current downlink packet can be made by the receiving device simply by not transmitting an acknowledgement (or "ack") message to the transmitting device. Such an implicit request can be made even though the receiving device has, in fact, received the current downlink packet. In contrast, other systems may request retransmission of the current downlink packet by having the receiving device explicitly make such requests. For example, some systems require that the receiving device explicitly transmit a non-acknowledgement "nack" message to the transmitting device in order to request retransmission of the current downlink packet. Alternative methods may be used depending upon the communication system protocol.

The third embodiment of the present invention advantageously utilizes the "nack" response of a receiving device to indicate a lack of acceptance of the packet. In accordance with the ARQ protocol of the Bluetooth Specification, when the method "nacks" a packet the transmitting device re-transmits the packet. In accordance with the third embodiment 700 of the present invention, a receiving device transmits an uplink packet to a transmitting device wherein the uplink packet comprises an enabled payload header flow control bit. In accordance with the above-described exemplary Bluetooth communication system, a payload header flow control bit is enabled or set to "on" when it has a value of logical zero.

The method proceeds to a decision STEP 720 whereat the method determines whether the transmitting device received the payload of the uplink packet (that was transmitted in the STEP 710) without errors. In accordance with the third embodiment 700, the method determines at the decision STEP 720 whether a receiving device received a payload ack message. If the method determines that the receiving device has not received a payload ack message, the method returns to the STEP 710 and thus the method implicitly transmits a request for the transmitting device to re-transmit a current downlink packet.

If the method determines at the decision STEP 720 that the receiving device received a payload ack message, the method proceeds to a STEP 740. The third embodiment 700 of the present inventive method terminates at the STEP 740 whereat the method ceases "nacking" the current packet and thus ceases to transmit a request for the transmitting device to re-transmit the current packet.

SUMMARY

In summary, the present invention is a novel method and apparatus for Bluetooth flow control. The present Bluetooth flow control method and apparatus utilizes an inventive two-step technique. In a first step, the present inventive method performs a dual flow control step wherein both packet header flow control and payload header flow control are enabled. In a second step, the present inventive method performs a payload header flow control step wherein the method determines whether the payload header flow control has been successfully received. If so, the packet header flow control is disabled (i.e., it is no longer transmitted to the transmitting device). Thus, in accordance with the present inventive Bluetooth flow control technique, a receiving device enables both packet header flow control and payload header flow control until a payload acknowledgment is received from a transmitting device.

A number of embodiments of the present invention have been described. Nevertheless, it will be understood that various modifications may be made without departing from the spirit and scope of the invention. For example, the present inventive method and apparatus can use any one of three techniques for flow control. One such example is a flow control performed through the use of non-acknowledgment or "nack" commands. In another example, flow control is performed through the use of a packet header flow control bit.

In addition, although examples of the present invention have been described in the context of Bluetooth communication systems, the present invention can be used to implement any communication system that uses multiple levels of flow control. Accordingly, it is to be understood that the invention is not to be limited by the specific illustrated embodiment, but only by the scope of the appended claims.

What is claimed is:

1. A method of controlling data flow in a wireless communication system, wherein the wireless communication system comprises at least one transmitting device and at least one receiving device, the method comprising the steps of:
   (a) transmitting an enabled payload header flow control message to at least one transmitting device;
   (b) disabling transmission of downlink packets subsequent to a current downlink packet;
   (c) determining whether the enabled payload header flow control message is received without error by the at least one transmitting device;
   (d) returning to step (a) if the enabled payload header flow control message is received with error; and
   (e) enabling transmission of downlink packets subsequent to the current downlink packet if the enabled payload header flow control message is received without error.

2. The method of controlling data flow in a wireless communication system as defined in claim 1, wherein the transmitting step (a) comprises transmitting an uplink packet including information regarding payload header flow control.

3. The method of controlling data flow in a wireless communication system as defined in claim 2, wherein the uplink packet further includes information regarding the disabling step (b).

4. The method of controlling data flow in a wireless communication system as defined in claim 3, wherein the uplink packet includes an enabled packet header flow control bit.

5. The method of controlling data flow in a wireless communication system as defined in claim 1, wherein the disabling step (b) comprises transmitting an uplink packet including information pertaining to packet header flow control.

6. The method of controlling data flow in a wireless communication system as defined in claim 5, wherein the uplink packet includes an enabled payload header flow control bit.

7. The method of controlling data flow in a wireless communication system as defined in claim 1, wherein the determining step (c) includes using a cyclic redundancy code (CRC) error check mechanism to determine if the enabled payload header flow control message was received without errors.

8. The method of controlling data flow in a wireless communication system as defined in claim 7, wherein the cyclic redundancy code (CRC) error check mechanism is a 16-bit CRC.

9. The method of controlling data flow in a wireless communication system as defined in claim 7, wherein the CRC error check mechanism is generated by a CRC-CCITT polynomial having an octal value of "210041".

10. The method of controlling data flow in a wireless communication system as defined in claim 1, wherein the determining step (c) includes the step of determining whether a selected receiving device received a payload acknowledgment "ack" message.

11. The method of controlling data flow in a wireless communication system as defined in claim 1, wherein the enabling step (e) comprises the step of disabling a packet header flow control.

12. The method of controlling data flow in a wireless communication system as defined in claim 11, wherein the enabling step (e) comprises the step of setting a packet header flow control bit to a logical off position.

13. The method of controlling data flow in a wireless communication system as defined in claim 1, wherein the disabling step (b) comprises ceasing to transmit an uplink packet including an acknowledgment "ack" message.

14. The method of controlling data flow in a wireless communication system as defined in claim 1, wherein the disabling step (b) comprises transmitting an uplink packet including a non-acknowledgment "nack" message.

15. The method of controlling data flow in a wireless communication system as defined in claim 1, wherein the enabling step (e) comprises the step of transmitting an acknowledgment "ack" message in response to the current downlink packet.

16. The method of controlling data flow in a wireless communication system as defined in claim 1, wherein the enabling step (e) comprises the step of ceasing to transmit a non-acknowledgment "nack" message in response to the current downlink packet.

17. The method of controlling data flow in a wireless communication system as defined in claim 1, wherein the wireless communication system is a Bluetooth communication system.

18. The method of controlling data flow in a wireless communication system as defined in claim 17, wherein the Bluetooth communication system utilizes an ARQ protocol.

19. A data flow control system, comprising:
   (a) a plurality of uplink packets;

(b) a plurality of downlink packets;

(c) a transmitting device adapted to transmit the plurality of downlink packets and receive the plurality of uplink packets, wherein the transmitting device is further adapted to determine whether an uplink packet has been received with error, and wherein the plurality of uplink packets includes information regarding a packet header flow control and a payload header flow control, and wherein the plurality of downlink packets includes information regarding a payload reception error; and (d) a receiving device adapted to receive the plurality of down link packets and transmit the plurality of uplink packets, wherein the receiving device is further adapted to transmit information regarding the packet header flow control and the payload header flow control.

20. The data flow control system as defined in claim 19, wherein the transmitting device includes a computing device, a transmission buffer, a radio and a reception buffer, and wherein the computing device is adapted to transmit a downlink packet to the transmission buffer and receive an uplink packet from the reception buffer, and wherein the transmission buffer is adapted to transmit a downlink packet to the radio, and wherein the radio adapted to transmit and receive a plurality of uplink and downlink packets from the receiving device.

21. The data flow control system as defined in claim 19, wherein the receiving device includes a computing device, a transmission buffer, a radio and a reception buffer, and wherein the computing device is adapted to transmit an uplink packet to the transmission buffer and receive a downlink packet from the reception buffer, and wherein the reception buffer is adapted to receive the downlink packet from the radio, and wherein the radio is adapted to transmit and receive a plurality of uplink and downlink packets from the transmitting device.

22. The data flow control system as defined in claim 21, wherein the radio comprises a transmitter and a receiver, wherein the transmitter is operatively coupled to the transmission buffer, and wherein the transmitter is adapted to receive the uplink packet from the transmission buffer and transmit the uplink packet to the transmitting device, and wherein the receiver is operatively coupled to the reception buffer, and wherein the receiver is adapted to transmit the downlink packet to the reception buffer and receive the downlink packet from the transmitting device.

23. A data flow control system, wherein the system includes at least one transmitting device and at least one receiving device, further comprising:

(a) means for transmitting an enabled payload header flow control message to at least one transmitting device;

(b) means for disabling transmission of downlink packets subsequent to a current downlink packet;

(c) means, responsive to the transmitting means, for determining whether the enabled payload header flow control message is received without error; and (d) means, responsive to the determining means, for enabling transmission of downlink packets subsequent to the current downlink packet if the enabled payload header flow control message is received without error.

* * * * *